United States Patent [19]

Vawter

[11] Patent Number: 4,695,257

[45] Date of Patent: Sep. 22, 1987

[54] PROBLEM SOLVING GAME

[76] Inventor: James R. Vawter, 688 Coronado Dr., Sedalia, Colo. 80135

[21] Appl. No.: 727,667

[22] Filed: Apr. 26, 1985

[51] Int. Cl.⁴ .................................................. G09B 1/06
[52] U.S. Cl. .................................... 434/333; 273/1 E; 273/157 R; 273/DIG. 28
[58] Field of Search ..................... 434/333; 273/157 R, 273/1 E, DIG. 28, 85 G

[56] References Cited

U.S. PATENT DOCUMENTS

| | | | |
|---|---|---|---|
| 3,242,594 | 3/1966 | Smith | 434/96 |
| 3,907,303 | 9/1975 | Locker | 273/157 R |
| 4,398,720 | 8/1983 | Jones et al. | 273/238 |

FOREIGN PATENT DOCUMENTS

| | | | |
|---|---|---|---|
| 19440 | 9/1934 | Australia | 434/333 |
| 744637 | 2/1956 | United Kingdom | 434/333 |

Primary Examiner—William H. Grieb
Attorney, Agent, or Firm—Joseph C. Herring

[57] ABSTRACT

The invention is a game in which tiles are placed on a game surface to teach a discipline or area of study. The invention will be described in terms of a math game board although the principles taught can be used with many fields of study. The surface has a series of geometrical shapes presented to the player either simultaneously or serially. Each of the geometrical shapes has a plurality of discrete marked off "problem bases". Each of the problem bases have a series of symbols providing a problem. A symbol or symbols on the answer base answers the problem presented via the problem base. When the answer base of each tile having a symbol or symbols correctly answering the problems presented on each of the problem bases is correctly placed on the appropriate problem base, the tiles correctively duplicate each of the geometric shapes of the series.

18 Claims, 2 Drawing Figures

U.S. Patent    Sep. 22, 1987    4,695,257

PROBLEM SOLVING GAME

SUMMARY OF THE PRIOR ART

There are many games and "teaching aids" designed to teach mathematics and spatial relationships. Educational catalogs show a plethora of software for school and home computer games, game boards and other teaching aids for various educational levels, disciplines and subjects. Thus, Creative Publications of Oak Lawn, Ill., 1985 catalog, pages 48 and 49 describe "Pizza Party" which uses slices of a simulated pizza to teach fractions. Similarly, D.L.M. Teaching Resources, Allen, Tex., 1985 catalog, page 69 describes a "Math Big Box" which includes three piece number puzzles, place value stamps, etc. Finally, the Soft-Kat Inc., Canoga Park, Calif. 1985 Educational Software Catalog describes hundreds of educational software packages for a variety of computers which teach spelling, grammar, mathematics, spatial relationships, and other subject matters. Typical of its mathematical programs are: "Quations", for fourth-and-up grades wherein number and operations tiles are dealt to each player and the players construct horizontal and vertical equations that intersect with a number or operation tile already on the board. Another program "Piece of Cake" for second grade through junior high teaches the basics of elementary mathematics. The students go into a bakery where they learn to add, subtract, multiply and divide while going through bakery operations.

Educational T.V. channels even have weekly programs to review educational software. This is necessary for the educator and public because programming is so widely known and practiced that generating new game programs is done by many companies on a routine basis. This is true even though the game structures can become quite complex, i.e., the robot computer chess game of U.S. Pat. No. 4,398,720 issued to L. T. Jones et al.

The Ideal School Supply Co. of Oak Lawn, Ill. has "Puzzle-Grams" which are designed to teach spatial relationships by the placement of "tiles" of various geometries on a variety of surfaces having different geometric shapes. The tiles, when each puzzle is solved, completely fill each geometric shape formed.

This invention combines the concept of simultaneously solving problems of math, physics, logic, chemistry and other disciplines, and spatial relationships by placing a series of tiles of various geometric forms and sizes on differing geometric shapes so as to completely fill the area of the geometric shape while answering the problems posed on problem bases on the game surface.

SUMMARY OF THE INVENTION

The invention is a game in which tiles are placed on a game surface to teach a discipline or area of study. The invention will be described in terms of a math game board although the principles taught can be used with many fields of study. The surface has a series of geometric shapes presented to the player either simultaneously or serially. The geometric shapes will vary with the discipline or study being taught. Each of the geometrical shapes has a plurality of discrete marked off "problem bases" surrounded by an undefined area. Each of the problem bases have a series of symbols providing a problem. A symbol or symbols on each tile answers the problem presented via each problem base. When the tile having a symbol or symbols correctly answering the problems presented on each of the problem bases has its answer base correctly placed on the appropriate problem base, the tiles collectively occupy the area of and between the problem bases duplicate each of the geometric shapes of the series.

DESCRIPTION OF PREFERRED EMBODIMENTS

Figure 2:
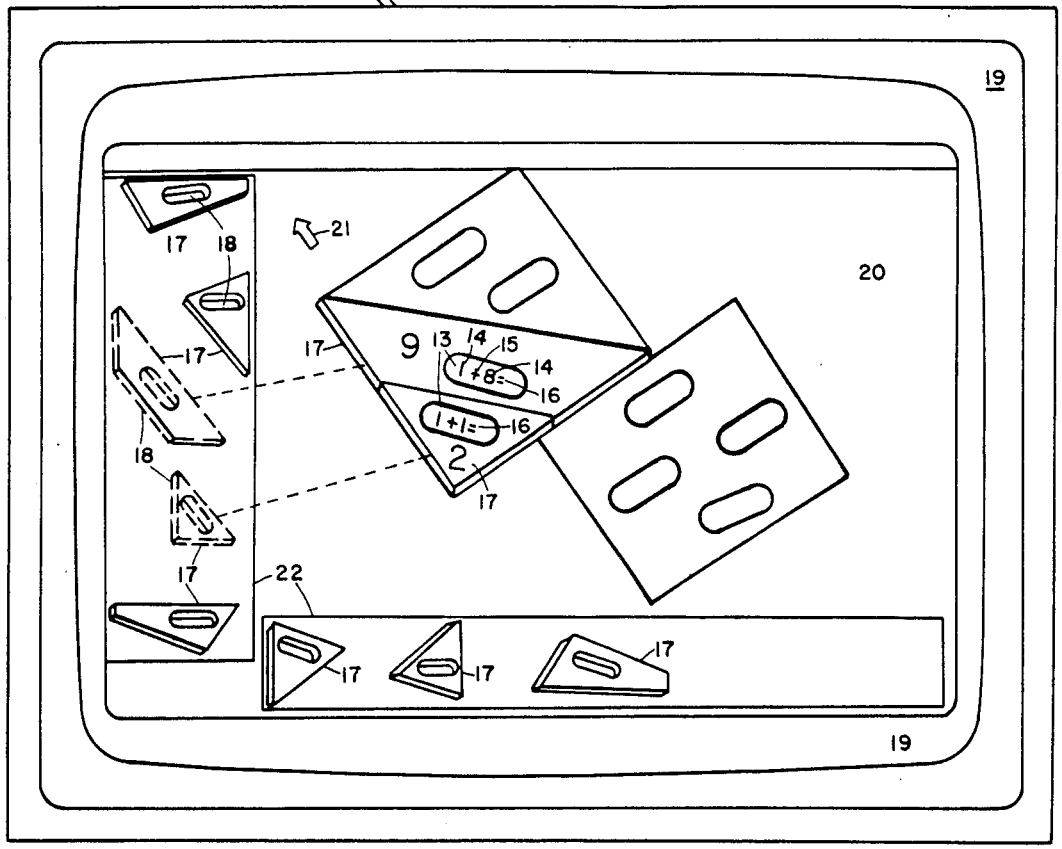
FIG. 2 depicts a single geometric shape and shows eight tiles which, when properly placed on the geometric shape, completely fill the geometric shape.
Figure 1:
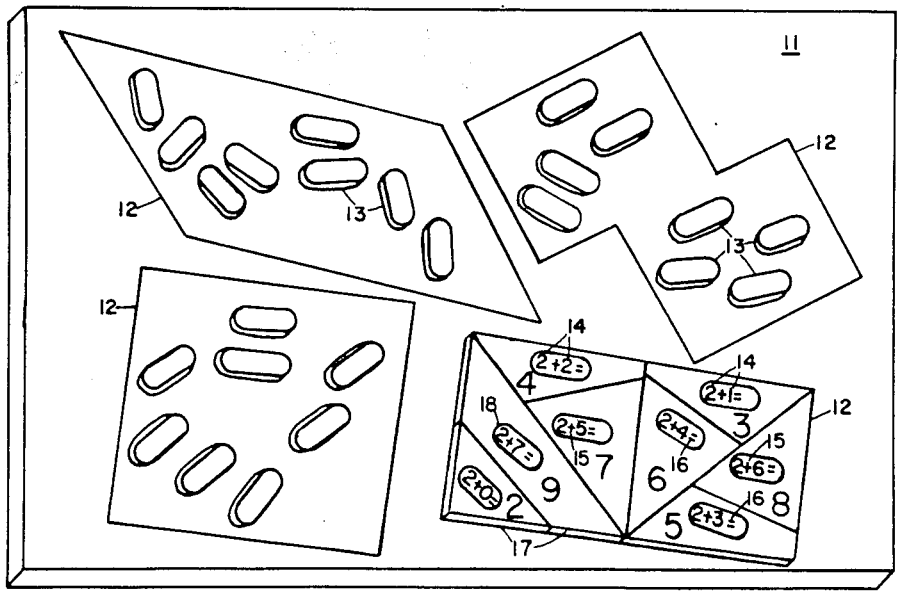
FIG. 1 depicts one side of a game board having four geometric shapes and eight problem bases per shape.

The same description numbers are used, where applicable, in FIGS. 1 and 2. The Figures are for illustration purposes only and are not intended to provide exact dimensions and size ratios. Numbers on problem bases are shown only where necessary to show the solution of a problem by correct placement of the tiles.

FIG. 1 depicts a game board having a surface 11 with four geometric shapes 12 imprinted thereon. Each of the geometric shapes 12 has eight raised problem bases 13. On each of the problem bases 13 are numbers 14 separated by an operand 15 and followed by an equals sign 16. The combination of numbers 14, operand 15 and equals sign 16 provides a problem to be solved. The rectangular geometric shape 12 in the lower right hand corner of the game surface 11 has eight tiles 17 numbered from "2" to "9" with "answer bases" 18 fitted over each of the problem bases 13 to completely fill the rectangular geometric shape. The number (unnumbered) on each of tiles 17 provides the answer to the problem displayed on each of the problem bases 13. The answer bases 18 must be aligned with each of the problem bases 13 to ensure that each of tiles 17 correctly fits within each geometric shape 12. In the Figures, the area of each of tiles 17 roughly corresponds to the size of the number imprinted thereon. Some of the differences within areas are small to ensure that a player does not rely on tile size alone to provide necessary answers.

FIG. 2 depicts a display which is the face of a computer monitor display having a case 19, a display 20, a cursor 21 and tile storage panels 22. The unit has a "mouse" with a control switch 24. The mouse 23 is connected to the unit by a cable 25.

In the device of FIG. 2, a computer program presents the geometric shapes to the player one at a time. Tiles 2 and 9 of FIG. 1 have been moved by cursor 21 from their original position (indicated by dashed lines) onto the proper problem bases. The player presses on control switch 24 and moves mouse 23 in a direction which moves the cursor 21 into a position to move a tile 17 and place its answer base properly on a particular selected problem base 13. Alternately, the usual cursor command keys on the computer keyboard can be used where desired.

GENERAL DESCRIPTION OF THE INVENTION

The following paragraphs additionally describe various facets of the invention.

Game board surfaces, as indicated by the Figures, can be solid (FIG. 1) or a display (FIG. 2) such as a cathode ray tube, liquid crystal display, electroluminescent display. A game board can have playing surfaces on one or both sides. Where the game board is multicolored, one color can define the surface, another the geometric shape and still another the problem base. In such a case, the problem bases 13 can but need not be raised. However, the answer base 18 of tiles 17 must be sufficiently transparent to permit problem bases 13 to be seen by the player or have an actual "hole" where problem bases 13 are raised.

Where the game board is a solid, the tile may be plastic and of any color. On a display, the tile can also be of any color.

The geometric shapes can be in the form shown for arithmetic problem solutions or can be in other forms related to various disciplines and studies, i.e., crystal forms in crystallographic studies, vibrational forms for vibrational studies, or atomic forms for stereochemical studies. Additionally, for the beginner in chemistry, bunsen burner, Erhlenmeyer flasks, test tubes, etc. shapes can be utilized. Other studies can include other "tool" forms. The tiles will in such cases be similarly shaped. The number of tiles and geometric areas in a particular game will vary with the complexity of the subject matter.

In another game form, problem bases 13 answer tiles 17 may be impregnated with a magnetizable material and the area of the problem base 13 and tile 17 oppositely magnetized to create an added dimension of education to the game. In still another model, problem bases 13 and tile 17 can be "flannel-board materials" or a Velcro-type looped pile fabric fastener material can be used.

While single capsule shaped problem bases and tiles are utilized in FIGS. 1 and 2, the problem bases and digit answers on a base can be plural and the shapes can be a variety of forms, i.e., hexagonal or rectangular.

"Numbers", "operands" and "equals" are all symbols used in describing the nonspatial aspects of this invention for simplicity's sake. Since all are symbols, they can be substituted by other symbols for aids in teaching various disciplines, i.e., chemistry, physics, logic, other number systems, etc.

The following examples indicate several of the many uses of the concepts of this invention. Thus, the "numbers", for chemical purposes, can be a mixture of numbers and symbols for atomic elements or compounds; the operand can be an addition sign and the equals sign can be arrows defining the direction of the reactions, i.e., in the representation of the reaction of sodium and chlorine, $2Na+Cl_2 \rightarrow 2NaCl$ or the alternative representation of the reaction of $Na^+ + Cl^- \rightleftharpoons NaCl$ in solution.

In physics, the numbers, operand and equals symbols may all be logical symbols as in the derivation of the formula for acceleration without the use of a constant, i.e., $\Delta v \alpha F(t)/m$.

Alternatively, in teaching the Roman numeral number system, i.e., $V+X=XV$, only letters would be used. In teaching the physics of light reflection, Snell's law can be expressed as sine $\theta_p$/sine $\theta = n$ and the geometry of the tiles can show, inter alia, that $\theta_p$ and $\theta$ are complementary angles (where $\theta + \theta_p = 90°) + \theta = \cos \theta_p$.

The "number" symbols may disappear entirely in some educational modes, i.e., in teaching the amplification and nulling of soundwaves, i.e., where drawings of 6 and 7 Hz and their combination where the vibrations are added to form a combination of amplified and atenuated waves in the form of an elipse with a null-to-null period of 1 Hz. Similarly, in teaching spatial relationships, the forms $\angle + \searrow = \triangle$, $( + ) = \bigcirc$ and $[+] = \square$ or in teaching trigonometry $a^2 + b^2 = c^2$. Those skilled in the education arts will quickly combine many combinations of geometric shapes and subject matters to utilize the inventive principles of this invention without more than routine creativity. Such combinations are intended to fall within the scope of the claims.

What is claimed is:

1. An educational game comprising tiles having answer bases and adapted to provide a view of problem bases on a game surface when the answer bases are correctly positioned on said problem bases and
a game surface having at least one of a series of predetermined undivided geometric shapes thereon, each geometric shape having a plurality of problem bases each of which has (a) a problem made up of at least two numbers, at least one operand, and at least one equal symbol disposed in a format which provides at least one problem to be answered by an answer displayed on a tile; and (b) is surrounded by an undefined area of the geometric shape so that the answer base of each tile, when correctly positioned upon the problem bases, causes the tiles to duplicate the predetermined geometric shape of each of the geometric shapes of the series and displays to the player both the problems and an answer to each of the problems.

2. The game of claim 1 wherein the game surface simultaneously displays a plurality of geometric shapes on a game board.

3. The game of claim 2 wherein both sides of the game board have game surfaces.

4. The game of claim 2 wherein the game board has two sides, eight geometric shapes and eight tiles which, when properly placed on the geometric shapes, duplicate the shapes of each of the geometric shapes.

5. The game of claim 1 wherein the game surface serially displays the geometric shapes on the face of a computer display.

6. The game of claim 1 wherein the problem bases are raised and the answer base of each tile is an opening which is slightly larger size and substantially the shape of the problem bases.

7. The game of claim 1 wherein the problem base is not raised and at least the answer base of each tile is relatively transparent and has substantially the same shape and size as the non-raised problem base.

8. The game of claim 1 wherein the numbers are arabic numbers.

9. The game of claim 1 wherein the numbers are Roman numerals.

10. The game of claim 1 wherein the problem bases each display at least one physics problem.

11. The game of claim 1 wherein the problem bases each display at least one arithmetic problem.

12. The game of claim 1 wherein the problem bases each display at least one chemistry problem.

13. The game of claim 1 wherein the problem bases each display at least one logic problem.

14. The game of claim 1 wherein the problem bases each display at least one geometry problem.

15. The game of claim 1 wherein the problem bases each display at least one trigonometry problem.

16. The game of claim 1 wherein the problem bases each display at least one crystallography problem.

17. The game of claim 1 wherein the problem bases each display at least one biology problem.

18. The game of claim 1 wherein the problem bases each display at least one stereochemical problem.

* * * * *